(12) United States Patent
Benjamin, III et al.

(10) Patent No.: US 12,181,375 B2
(45) Date of Patent: Dec. 31, 2024

(54) ASSEMBLING AND TESTING AMPOULES

(71) Applicant: Armtec Defense Products Co., Coachella, CA (US)

(72) Inventors: Willie Edward Benjamin, III, Cathedral City, CA (US); Andrew J. Sanderson, Indio, CA (US)

(73) Assignee: Armtec Defense Products Co., Coachella, CA (US)

( * ) Notice: Subject to any disclaimer, the term of this patent is extended or adjusted under 35 U.S.C. 154(b) by 238 days.

(21) Appl. No.: 17/983,295

(22) Filed: Nov. 8, 2022

(65) Prior Publication Data
US 2023/0141451 A1    May 11, 2023

Related U.S. Application Data

(60) Provisional application No. 63/280,082, filed on Nov. 16, 2021, provisional application No. 63/277,896, filed on Nov. 10, 2021.

(51) Int. Cl.
*G01M 3/28* (2006.01)
*G01M 3/02* (2006.01)

(52) U.S. Cl.
CPC ............ *G01M 3/2853* (2013.01); *G01M 3/02* (2013.01)

(58) Field of Classification Search
CPC ...... G01M 3/2853; G01M 3/02; G01M 3/002; G01M 3/38
See application file for complete search history.

(56) References Cited

U.S. PATENT DOCUMENTS 8,813,652 B2 *  8/2014  Shin .................... F42B 8/02
                                                    102/513

FOREIGN PATENT DOCUMENTS

JP        2002012974 A  *  1/2002  ......... C23C 16/4401

OTHER PUBLICATIONS

English Machine Translation of JP 2002012974 A, Translated Online Sep. 2024 (Year: 2002).*

* cited by examiner

*Primary Examiner* — David Z Huang
(74) *Attorney, Agent, or Firm* — Perkins Coie LLP

(57) ABSTRACT

The present technology is generally directed to assembling and testing ampoules, and associated systems, devices, and methods. Each ampoule can include a body portion configured to carry a marking material within an interior of the body portion, and a base portion configured to couple to the body portion to seal the interior of the body portion. The ampoules can be assembled and/or tested in an inverted orientation. In the inverted orientation, the ampoule can include a gap between the marking material and the base portion. For example, the ampoule can be positioned within a leak detection system and the ampoule's gap can be aligned with one or more leak detection components configured to analyze the gap for leak-related indicia.

21 Claims, 9 Drawing Sheets

ASSEMBLING AND TESTING AMPOULES

CROSS-REFERENCE TO RELATED APPLICATIONS

The present application claims priority to U.S. Provisional Patent Application No. 63/277,896, titled Assembling and Testing Ampoules, filed Nov. 10, 2021, and U.S. Provisional Patent Application No. 63/280,082, titled Assembling and Testing Ampoules, filed Nov. 16, 2021, each of which is incorporated herein by reference.

TECHNICAL FIELD

The present technology is directed to ammunition manufacturing, and more particularly to assembling and testing sealed ampoules carried in the ammunition rounds, wherein the ampoules contain material reactive to air.

BACKGROUND

Training and practice ammunition rounds can carry a pyrophoric or reactive payload configured to react with environmental air upon impact to indicate to a user the training round's impact location. Generally, the components in training rounds containing the pyrophoric material are inspected for leaks before final assembly of the round. Two such inspection methods include pressure decay testing and helium leak testing. In a pressure decay test, the component, such as an ampoule containing pyrophoric powder, is placed in a chamber of known volume and the chamber is pressurized with air. A transducer within the chamber measures the change in pressure versus time to determine a leak rate of air into the training round. In many such systems, however, too much of the pressurized air may enter a leaky ampoule before the leak is detected, which can lead to a larger pyrophoric reaction within the ampoule. In a helium leak test, the ampoule is packaged in a helium rich atmosphere, or an interior of the ampoule is injected with a helium rich mixture. The ampoule is then placed into a chamber and subjected to a vacuum to withdraw the helium from within the training round, such that the helium can be detected by a mass spectrometer or thermal conductivity detector. However, the amount of helium used in helium leak testing can make these tests cost prohibitive. Accordingly, there is a need for improved testing methods that are safer and less expensive to perform.

SUMMARY

The system and method of the current technology overcome drawbacks experienced in the prior art and provide additional benefits. An embodiment of the present technology provides a method for assembling and testing an ampoule assembly for air leakage, the ampoule assembly having a body portion, a base portion, and a pyrophoric payload. The method comprises positioning the body portion, the base portion, and the pyrophoric payload in an air-free, inert environment, wherein the body portion has a closed end, an open end, and an interior area. The pyrophoric payload is positioned into the interior area of the body portion through the open end, wherein the body portion is oriented with the open end above the closed end. The base portion is attached to the open end of the body portion with the pyrophoric payload enclosed in the interior area and with a seal formed between the base portion and the body portion, wherein the ampoule assembly is oriented in an inverted orientation with the base portion vertically above the pyrophoric payload in the interior area and with an upper surface of the pyrophoric payload being spaced apart from the base portion by a gap. The ampoule assembly is removed from the air-free, inert environment and is positioned in a testing environment that contains air, wherein the ampoule assembly is in the inverted orientation with the gap laterally adjacent to a detection component configured to detect through the body portion energy from the upper surface pyrophoric payload. The laterally adjacent detection component monitors the upper surface of the pyrophoric payload or the gap to detect light or heat energy from a reaction between air and the pyrophoric payload, wherein the reaction indicates an air leak in the seal between the base portion and the body portion.

In some embodiments, forming a seal can comprise coupling the body portion and base portion with an adhesive to form an annular seal in a plane substantially perpendicular to a longitudinal axis of the ampoule assembly. The body portion and the base portion can have corresponding surfaces that sealably interconnect to form a sealing region between the base and body portions. The ampoule assembly can be moved from the air-free, inert environment to the testing environment while the ampoule assembly remains in the inverted orientation with the pyrophoric payload being carried in the body portion below the gap. The ampoule assembly is positioned in a testing environment in the inverted orientation to maintain an optical path laterally through the ampoule assembly, and the detection component conducts the monitoring laterally along the optical path. The ampoule assembly can be positioned in a transfer rack in the air-free, inert environment with the transfer rack supporting the ampoule assembly in the inverted position, and the transfer rack and the ampoule assembly are moved as a unit to the testing environment. The ampoule assembly can be positioned in a testing environment that includes a pressure chamber that pressurizes air in the chamber to a pressure above ambient pressure, and the upper surface of the pyrophoric payload or the gap is then monitored while the ampoule assembly is under pressure. The ampoule assembly can be positioned in a testing stand that supports the ampoule assembly in the inverted position. The testing stand and the inverted ampoule assembly are moved as a unit in a pressure chamber with the gap of the ampoule assembly being laterally aligned with the detecting component.

Another embodiment of the present technology provides a method for testing an ampoule assembly for air leakage, the ampoule assembly having a body portion, a base portion, and a pyrophoric payload. The method comprises transferring the ampoule assembly from an air-free, inert environment to a testing environment containing air, wherein the base portion is sealably attached to the open end of the body portion with the pyrophoric payload contained in the body portion. The ampoule assembly is oriented in an inverted orientation with the base portion vertically above the pyrophoric payload in the interior area with an upper surface of the pyrophoric payload being spaced apart from the base portion by a gap. The ampoule assembly is positioned in the testing environment with the gap in lateral alignment with a detection component, wherein the detection component is configured to detect energy emission from the pyrophoric payload. The detection component monitors the upper surface of the pyrophoric payload or the gap to detect light or heat energy from a reaction between air and the pyrophoric payload while the ampoule assembly remains in the inverted position, wherein the reaction indicates an air leak in the seal between the base portion and the body portion.

DETAILED DESCRIPTION

The present technology provides systems, devices, and methods for manufacturing (e.g., assembling, testing, etc.) an ampoule or payload for an ammunition round or other carrier, wherein the ampoule contains a reactive payload. The ammunition round and ampoule can be configured as a practice ammunition and/or other training round. The manufacturing process and the resulting ampoules and ammunition round overcome drawbacks of the prior art and provide other benefits. The systems, devices, and methods described herein can be safer, more accurate, and/or more sensitive compared to pressure-decay testing, helium leak testing, and other systems, devices, and methods for manufacturing ampoules. In some embodiments, manufacturing ampoules can include an assembly phase and/or a testing phase. The ampoules can each include a frangible body portion configured to carry a reactive payload or marking material within an interior of the body portion, and a base portion sealably coupled to the body portion to seal the ampoule to prevent air from inadvertently getting into the interior of the ampoule and reacting with the payload carried by the ampoule. The ampoule can be assembled in an inverted orientation where the ampoule includes a gap between the payload and the base portion. Methods for assembling ampoules in accordance with embodiments of the present technology can be performed with at least a portion of the ampoule in the inverted orientation. Additionally, methods for testing ampoules in accordance with embodiments of the present technology can be performed with the ampoule in the inverted configuration. For example, testing the ampoule can include positioning the ampoule in a leak detection system with the ampoule in the inverted configuration, aligning at least a portion of the ampoule with a leak detection component of the leak detection system positioned laterally adjacent to the inverted ampoule, and using the leak detection system to analyze the ampoule from the side for one or more leaks. The leak detection component allows for testing and inspection over a larger surface area of the associated payload in the ampoule. This assembly and testing configuration can increase the sensitivity, accuracy, and/or time-to-result of the systems described herein.

Several specific details of one or more embodiments of the present technology are set forth in the following description and the Figures to provide a thorough understanding of certain embodiments of the invention. One skilled in the art, however, will understand that the present technology may have additional embodiments, and that other embodiments of the invention may be practiced without several of the specific features described below.

Figure 1:
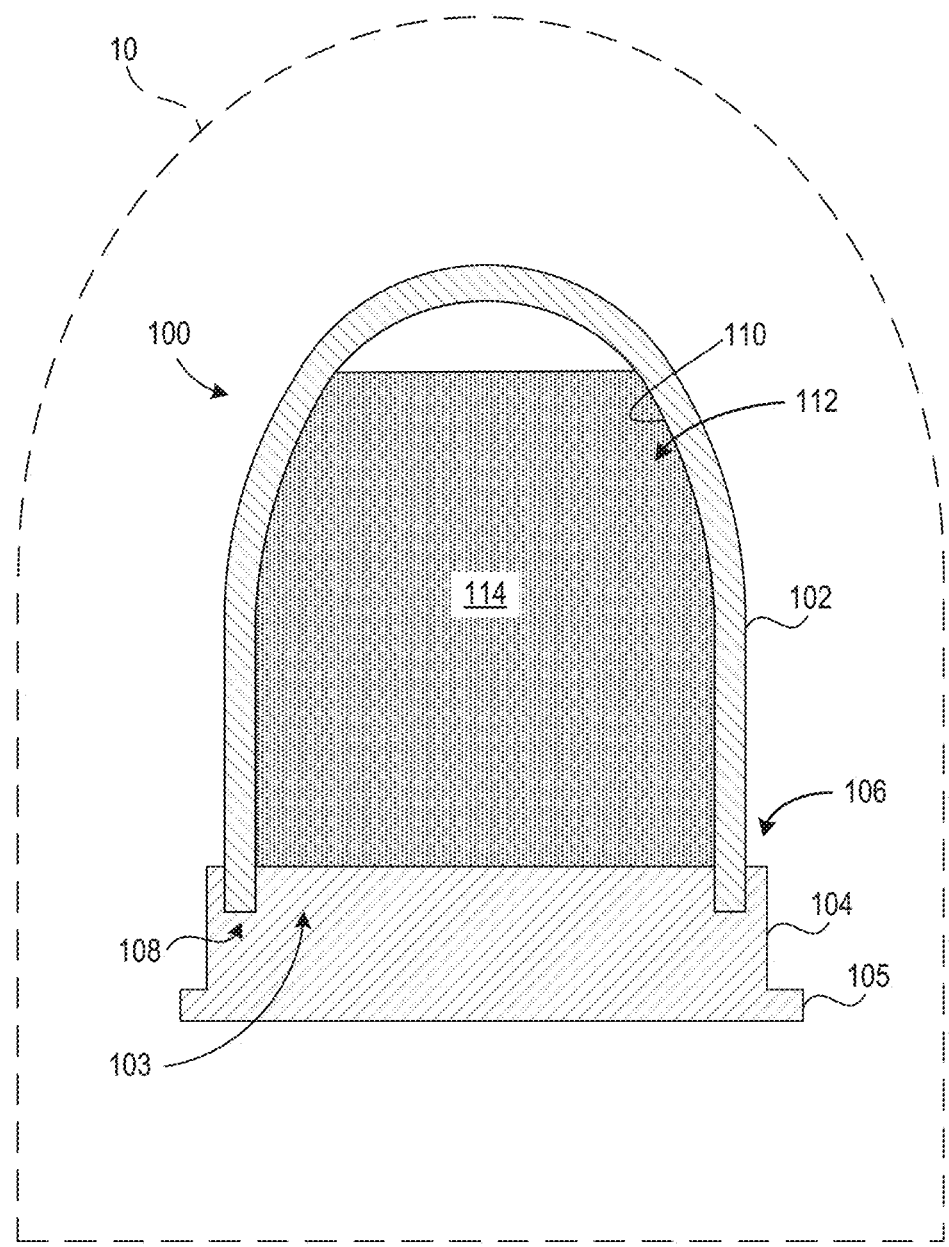
FIG. 1 is a schematic, cross-sectional illustration of an ampoule containing pyrophoric materials for installation within an ammunition training round in accordance with various embodiments of the present technology.

FIG. 1 is a schematic, cross-sectional illustration of an ampoule 100 containing one or more pyrophoric materials in the payload 114, and the ampoule can be positioned in an ammunition training round 10, such as a 40 mm training round, or any other suitable round. The ampoule 100 has a frangible body portion 102 attached or otherwise coupled to a base portion 104 at a sealing region 106 (e.g., a coupling region, an intermediate region, etc.) at least partially between the body portion 102 and the base portion 104. During manufacturing, and as discussed in greater detail below, the ampoule 100 can contain the reactive payload 114, such as a pyrophoric or other suitable reactive material, and the properly sealed interface between the base portion 104 and the body portion 102 prevents air from inadvertently getting into the ampoule and prematurely reacting with the payload 114.

The body portion 102 can be partially or fully transparent. In at least some embodiments, for example, the body portion 102 can be formed from glass, or any other suitable frangible material that will break and release the payload when the associated ammunition round 10 is fired and impacts a target area. In the illustrated embodiment, the base portion 104 can include an outer annular flange or rib 105, which can extend at least partially or fully around an outer perimeter of the base portion 104. The sealing region 106 of the ampoule 100 can include one or more matching and/or corresponding surfaces (e.g., end surfaces, side surfaces, etc.) of the body portion 102 and/or the base portion 104, such that the body portion 102 is sealably connected to the base portion 104 at the sealing region 106. In some embodiments, sealably connecting the body portion 102 and the base portion 104 is designed to provide an air-tight seal 108 (e.g., a substantially fluid-impermeable seal) between the body portion 102 and the base portion 104. As manufacturing processes may not be absolutely perfect 100% of the time, the ampoule 100 and the seal 108 need to be tested to ensure that the seal 108 does not have a slight defect that may permit air to penetrate into the ampoule and react with the payload 114. In the illustrated embodiment, the seal 108 is an annular seal formed in a plane substantially perpendicular to a longitudinal axis of the ampoule 100. In other embodiments, the seal 108 can have any other suitable configuration. The seal 108 can be formed using adhesives and/or any other suitable process or technique for forming a seal 108 between the body portion 102 and the base portion 104.

The body portion 102 can include an inner surface 110 that at least partially defines an interior 112 (e.g., a chamber or a payload region) of the ampoule 100. The base portion 104 can be at least partially aligned with the interior 112 of the body portion 102, e.g., to at least partially cover or otherwise block an opening 103 of the body portion 102. The seal 108 between the body portion 102 and the base portion 104 can partially or fully prevent one or more fluids (e.g., environmental air, environmental oxygen, etc.) in the environment external to the ampoule 100 from entering the interior 112 of the ampoule 100. The interior 112 of the ampoule 100 can be partially or fully filled with the reactive payload 114. The payload 114 can be configured to react (e.g., spontaneously react) in the presence of environmental air and, accordingly, can mark or otherwise indicate (e.g., visually indicate to a user) the impact location of a fired ammunition round 10 carrying the ampoule 100. For example, the payload 114 can include a pyrophoric material, such as the pyrophoric VIS-IR material described in U.S. Pat. No. 10,106,473, filed Aug. 27, 2015, the entirety of which is incorporated by reference herein, or any other suitable marking material. Because the payload 114 can react if exposed to environmental air, the air-impervious body portion 102, base portion 104, and the seal 108 can maintain the payload 114 in an unreacted state and/or in an inert environment until the ampoule 100 is intentionally ruptured to disburse the payload. Accordingly, the seal 108 can allow the ampoule 100 to be stored, transported, and/or otherwise manipulated without or substantially without risk of the payload 114 inadvertently reacting. If, however, during the manufacturing and/or the assembly process the seal 108 has a flaw that can cause an air leak into the ampoule's interior area containing the payload, such flaw needs to be detected quickly and accurately by testing the ampoule during the manufacture/assembly process.

Figure 2:
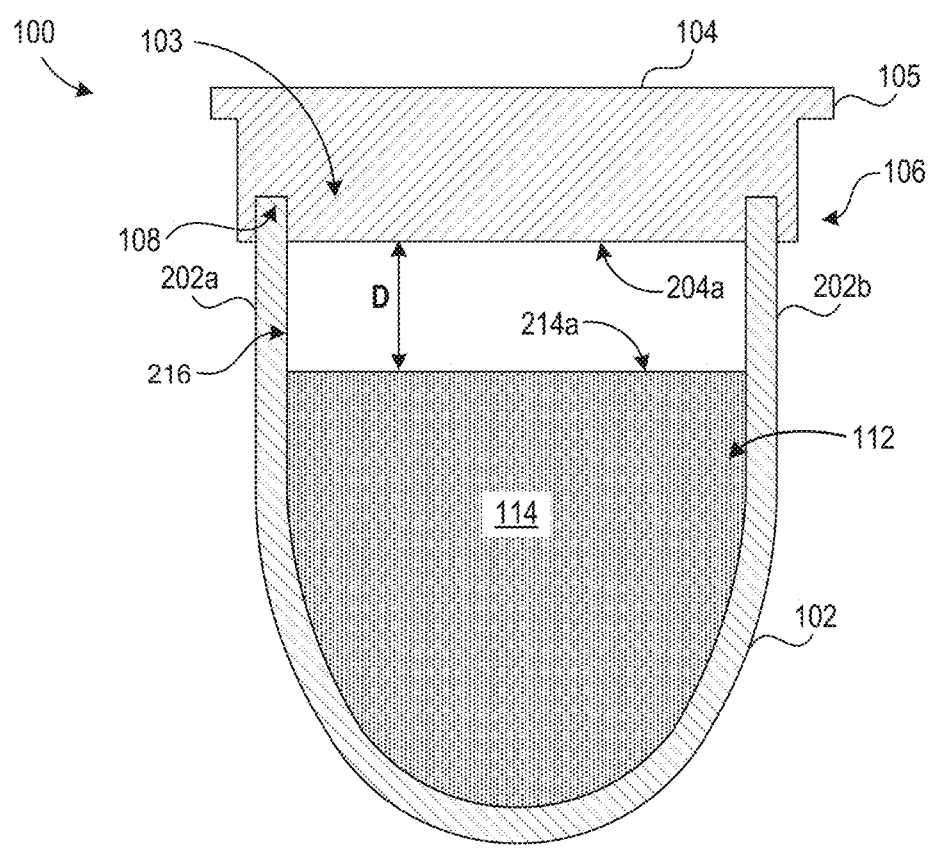
FIG. 2 is a schematic illustration of the ampoule of FIG. 1 illustrated in an inverted orientation.

FIG. 2 is a schematic illustration of the ampoule 100 of FIG. 1 illustrated in an inverted orientation with the base portion 104 positioned above the body portion 102, such that the opening 103 of the body portion 102 faces upwardly. In the inverted orientation, the payload 114 is carried in the body portion 102, wherein there may be a selected gap 216 between the base portion 104 and the upper surface of the payload 114. It is noted that, for purposes of discussion only, the size of the gap 216 as illustrated in FIG. 2 is exaggerated to better illustrate certain aspects of the present technology. A person of skill in the art will appreciate that, in practice, the gap 216 may be significantly smaller than the gap shown in FIG. 2. In addition, the actual size of the gap 216 may vary based on the composition of the payload 114. For example, if the payload 114 is an iron-based pyrophoric material, the powder material may compress or settle within the ampoule's interior area after being deposited into the ampoule's inverted body portion during the manufacturing process.

In the illustrated embodiment, the gap 216 has a distance D between a base portion surface 204a of the base portion 104 and a payload surface 214a of the payload 114. The distance D can be between about 0.01 mm and about 10 mm, such as at least 0.01 mm, at least 0.1 mm, 1 mm, 2 mm, 5 mm, or any other suitable distance. In these and other embodiments, the distance D can correspond to an amount (e.g., mass, volume, etc.) of payload 114 within the interior 112, such as in an uncompressed condition.

The gap 216 between the payload 114 and the base portion 104 can provide one or more optical paths laterally through the ampoule 100. For example, as described previously regarding FIG. 1, the body portion 102 can be partially or fully transparent to light (e.g., visible light, IR light, etc.) and/or heat energy and, accordingly, energy (e.g., light and/or heat energy) can be detectable through at least part of the body portion 102 at the gap 216 above the payload, and/or in a direction substantially perpendicular to a longitudinal axis of the ampoule 100. As described in greater detail below regarding FIGS. 4A and 4B, the transparent properties of the body portion 102 can allow one or more leak detection components to "see" laterally through at least a portion of the ampoule's gap 216 and along the top surface area of the payload, so as to ensure that there are no air leaks in the seal 108. For example, the detection components positioned laterally adjacent to an assembled ampoule can be configured to detect light and/or heat energy that passes through the gap 216 of the ampoule 100 and through opposing side surfaces 202a, 202b of the body portion, including any light or heat energy generated by exposure of the payload 114 to environmental air that may have entered the ampoule 100 through a leak in the seal 108.

The ampoule 100 can be assembled while at least a portion (e.g., the base portion 104, the body portion 102, and/or any other suitable portion) of the ampoule 100 is in the inverted orientation. In some embodiments, for example, the ampoule 100 can be assembled in an inert environment in a glovebox or other suitable assembly area, while at least the body portion 102 is in the inverted orientation. In such embodiments, the reactive payload 114 can be deposited within the interior 112 of the body portion 102 through the body portion's upwardly-facing opening 103, and the base portion 104 can be aligned and fully adhered with an air-impervious adhesive around the entire perimeter of the edge of the body portion or otherwise fully coupled to the body portion 102 to form the seal 108 completely between and around the upper edge of the body portion 102 and a mating receiving groove in the base portion. As described in greater detail below, ampoules remain in the inverted orientation during the manufacturing process, which minimizes the need for personnel to interact with the ampoules during the process.

Figure 3A:
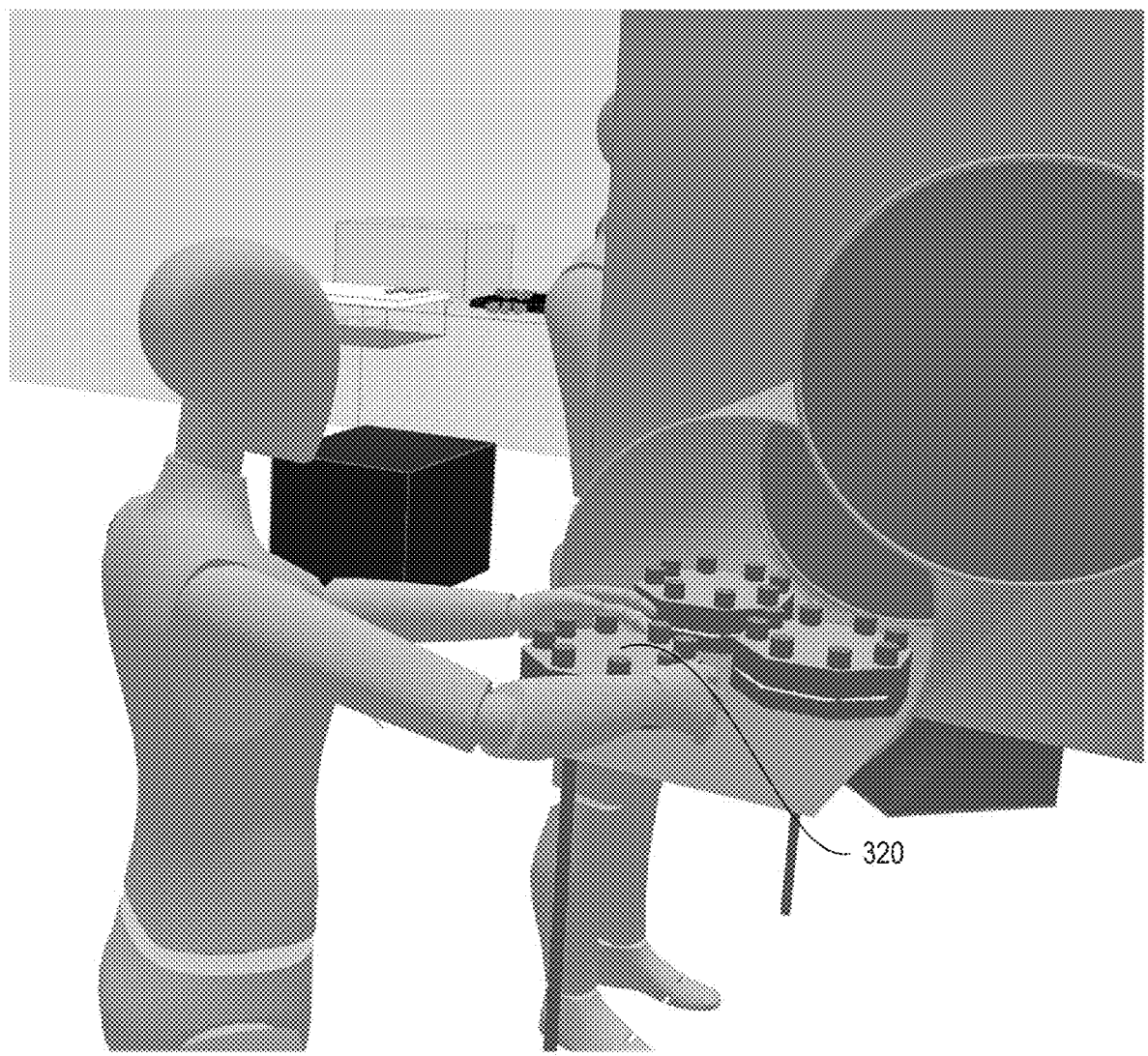
FIGS. 3A-3D are schematic illustrations of various stages of manufacturing and testing the ampoule of FIG. 2 in accordance with aspects of the present technology.
Figure 3B:
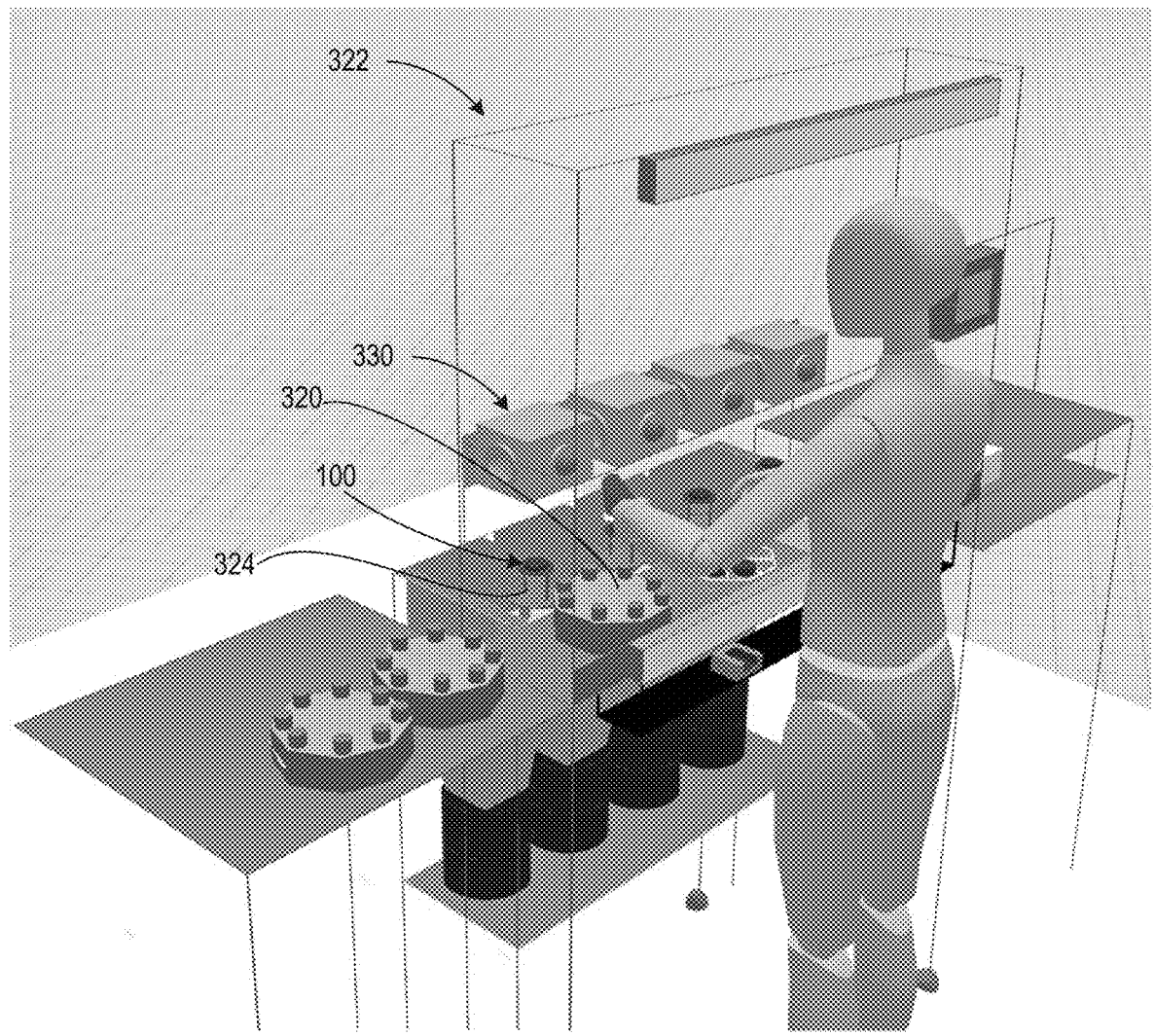

FIGS. 3A-3D are schematic illustrations of various stages of a method for manufacturing and testing the ampoule 100 of FIGS. 1 and 2, the method in accordance with embodiments of the present technology. One or more ampoules 100 can be assembled in an air-free, inert environment, such as the sealed glovebox with a nitrogen environment, or another suitable assembly area. Referring to FIG. 3A, once the ampoules 100 (not shown) are fully assembled while inverted and the seal 108 (FIGS. 1 and 2) is fully cured or otherwise formed, the assembled ampoules 100 are transferred into a transfer rack 320 located in the glovebox. The transfer rack 320 receives and retains the ampoules 100 in the inverted orientation, so the ampoules do not need to be further handled and flipped over to a non-inverted orientation. This arrangement can also provide additional time for the seal to cure or otherwise set without interfacing with the reactive payload 114 now fully contained in the ampoule. When one or more transfer racks in the glovebox are loaded with the assembled ampoules 100, the full transfer rack(s) 320 can be carefully moved out of the glovebox using selected transfer protocols and to an ampoule testing station 322 (FIG. 3B).

Referring to FIG. 3B, the testing station 322 has one or more ampoule testing stands 324 configured to receive and support an ampoule while still in the inverted position. Each testing stand 324 of the illustrated embodiment can be configured to support a given ampoule 100 beneath a corresponding leak detection system 330. The leak detection system 330 is described in greater detail below regarding FIGS. 4A and 4B.

Figure 3C:
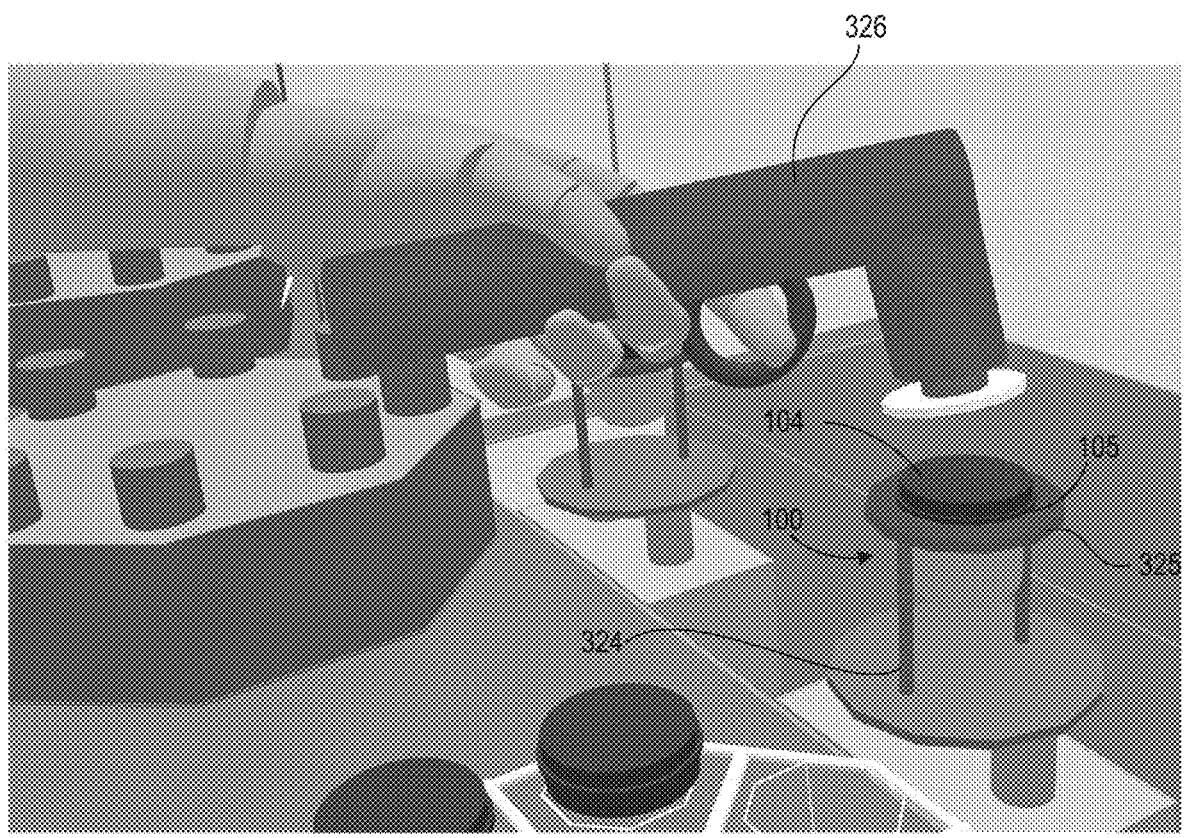

In the illustrated embodiment, the base portion 104 of each ampoule can be formed from or contain a ferrous or other magnetic material. In some embodiments, the base portion 104 can be formed from a combination of metallic and non-metallic materials. In other embodiments, the base portion 104 may be a non-magnetic material, such as a lightweight, high-strength plastic, while the payload may be a ferrous-based or other magnetically engageable material. Referring to FIG. 3C, each of the ampoules 100 with the magnetic base portion 104 and/or payload 114 can be engaged and moved out of the transfer rack to the testing stand 324 via a magnetic tool 326 configured to magnetically couple to the base portion 104 and/or payload 114 of each ampoule 100. Movement of the ampoules 100 via the magnetic tool 326 allows for easy and quick transfer without having to rotate the ampoules 100 away from the inverted position. Additionally, the magnetic tool 326 can allow the user to interact with the ampoule 100 indirectly and/or at a distance removed from the ampoule 100, e.g., without the user directly handling the ampoule 100 with their hands. In one embodiment, the magnetic tool 326 may be a manual tool handled directly by a user. In other embodiments, the magnetic tool 326 may be an automated or robotic tool that allows personnel to move and manage the assembled ampoules from a remote location. Interacting with the ampoule 100 via the magnetic tool 326 can be more efficient and effective than directly handling the ampoule 100. In embodiments where the ampoule 100 assembly is at least partially automated, the magnetic tool 326 can provide a safer and/or more reliable way for an automated assembly system to transport and/or interact with the ampoule 100.

Figure 3D:
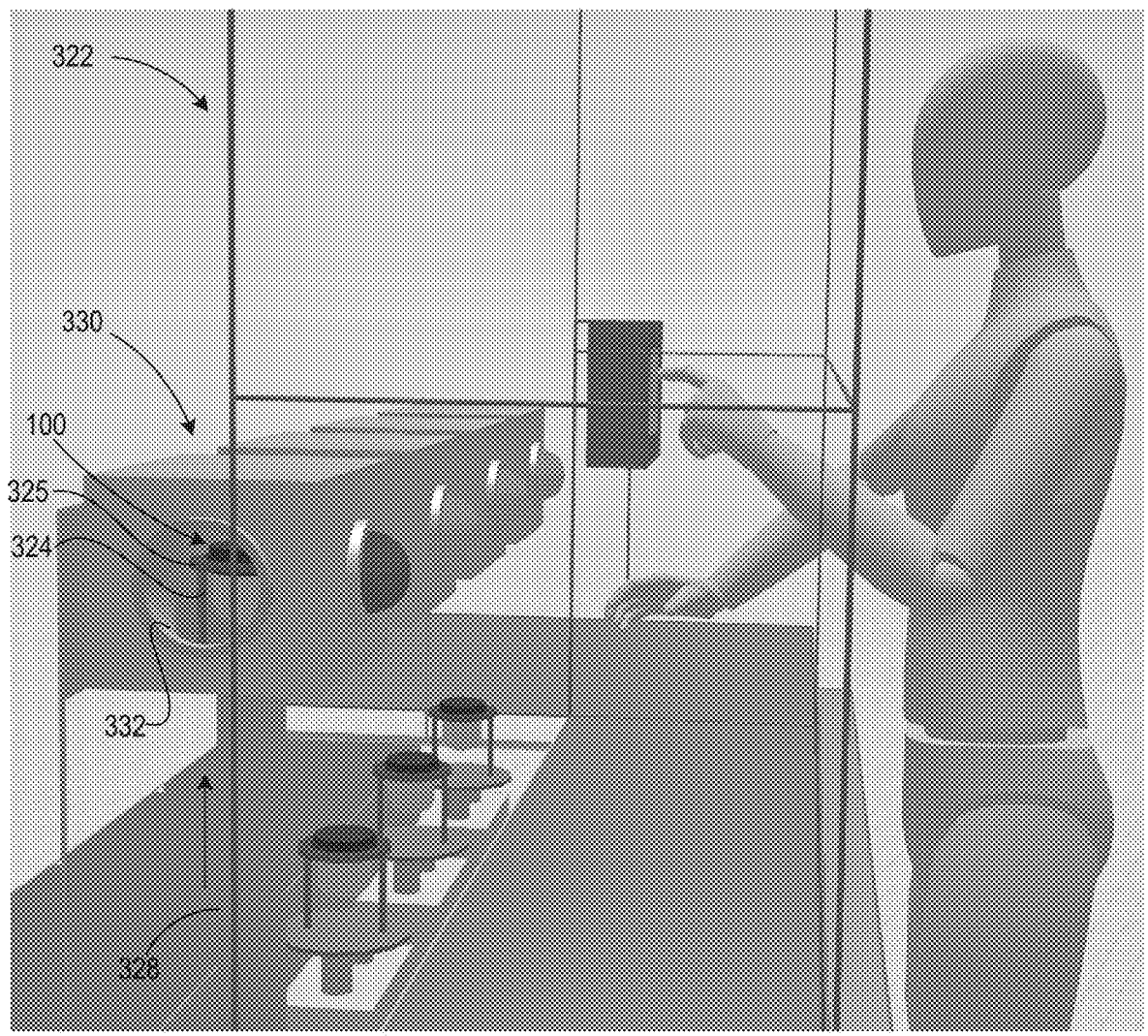

Referring to FIG. 3D, each testing stand 324 can have an ampoule receiving member, such as an annular shaped retention ring 325 with an opening shaped and sized to receive an ampoule 100 while being smaller than the diameter of the base portion's outer flange 105 (FIG. 3C). The testing stand 324 is configured to raise at least the retention ring 325 and associated installed ampoule 100 into a corresponding leak detection system 330 (e.g., a pressure chamber 332 of the leak detection system 330) via an actuating platform or lifting member 328. In at least one embodiment, the ampoule receiving member is coupled to a closure plate attached to a pneumatic actuator that is actuated to raise and lower the closure plate and ampoule receiving member relative to the pressure chamber 332. The closure plate can act as a chamber door that sealably engages and closes the chamber 332 with the ampoule 100 in its closed interior area that can be pressurized, as discussed in greater detail below. Once the ampoule 100 is positioned within the leak detection system 330, the pressure chamber 332 is locked in the closed position (e.g., closure plate and/or the pneumatic actuator are locked in a closed position). Compressed air is then introduced into the chamber 332 to act as a stimulus signaling whether there is a leak path to the pyrophoric payload material in the ampoule 100. If a leak is detected by the laterally adjacent detectors, the pressure in the chamber 332 can be exhausted and then the chamber 332 unlocked, and the ampoule 100 lowered from the chamber 332. In some embodiments, the pressure chamber 332 can be configured so a user can manually terminate the testing sequence and override the lock command, such as if a defective ampoule needs to be removed from testing facility immediately. In some embodiments, multiple pressure chambers can be used simultaneously, and if a defective ampoule is located, a user or the system may analyze leak information. If suitable, the other pressure chambers can continue to operate until the system or operator decides to abort the testing process to extract the apparently defective ampoule. After testing is completed, the actuating platform 328 is unlocked and can lower the retention ring 325 and the installed ampoule 100, and the tested ampoule 100 can be engaged with a magnetic tool 326, lifted out of the retention ring 325, and returned to a transfer rack 320 (FIGS. 3A and 3B) or other component for transfer to subsequent assembly station(s), e.g., for loading into an ammunition round.

Figure 4A:
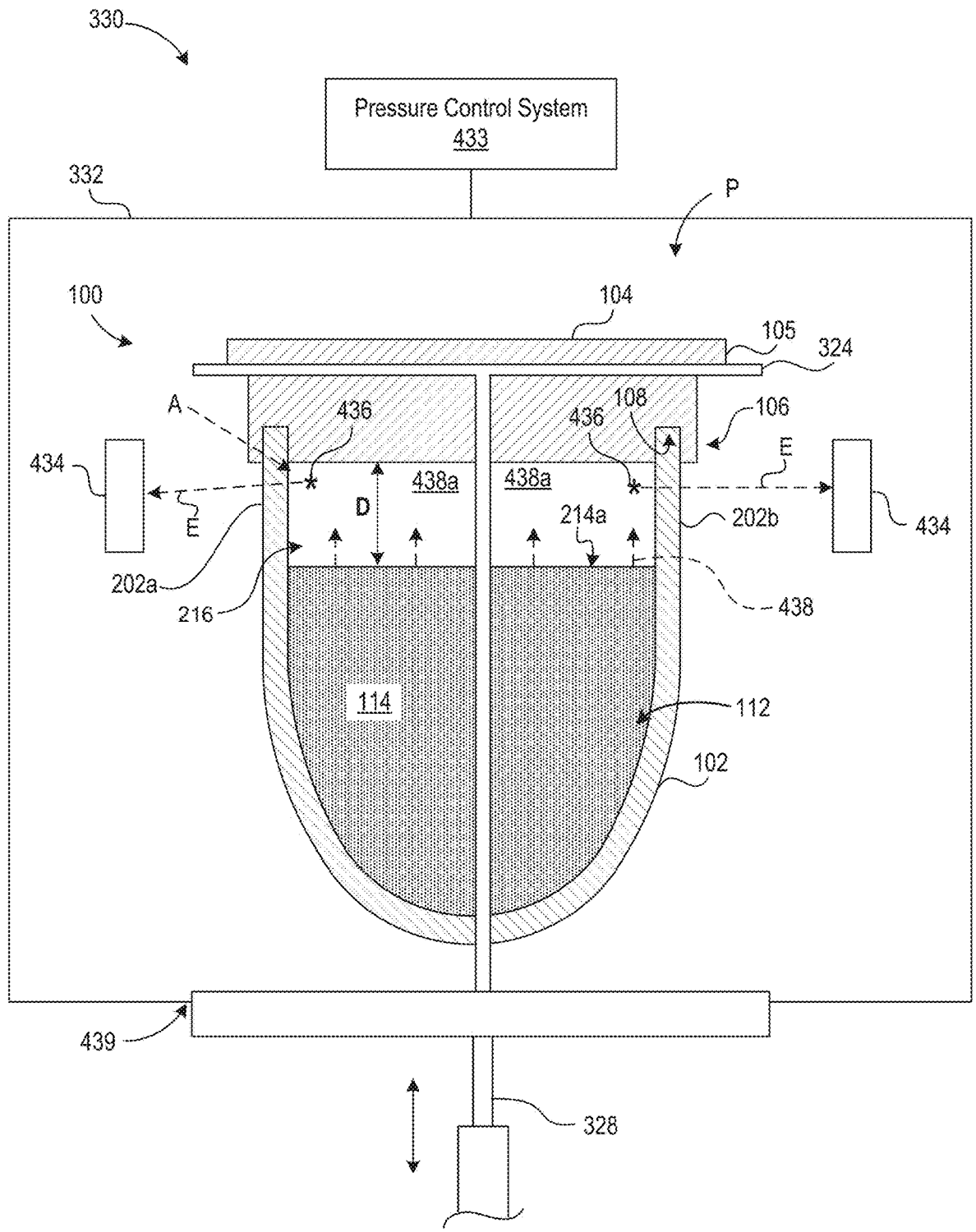
FIG. 4A is a schematic illustration of the ampoule of FIG. 2 in a leak detection system.

FIG. 4A is a schematic illustration of a leak detection system 330 ("the system 330") configured in accordance with various embodiments of the present technology. The system 330 can be configured to test, analyze, and/or otherwise determine an integrity of the ampoule's seal 108, including whether the seal 108 includes one or more leaks. In the illustrated embodiment, the leak detection system 330 is a pressure testing system that includes the pressure chamber 332 configured to have a variable interior pressure P. The pressure chamber 332 can be operably coupled to a pressure control system 433 configured to control the interior pressure P of the pressure chamber 332. The pressure control system 433 can include one or more valves, air compressors, vacuum components, air delivery hoses, air vacuum hoses, and/or any other suitable components. The pressure control system 433 can be configured to transition the interior pressure P of the pressure chamber 332 between selected positive pressures, such as in the range of approximately 5-65 psi. Additionally, the system 330 can include one or more leak detection components 434, each of which can be positioned at least partially within the pressure chamber 332. In some embodiments, for example, one or more of the leak detection components 434 can be fixed to an interior surface of the pressure chamber 332. In other embodiments, some or all of the leak detection components can be exterior of the pressure chamber 332, but the pressure chamber 332 can have a window or other feature that allows the leak detection components to monitor or otherwise analyze the ampoule in the pressure chamber 332 to determine whether the seal 108 has a leak. In the illustrated embodiment, each of the leak detection components 434 can include one or more photodiodes, optical sensors, cameras, IR cameras, temperature sensors, light sources, lasers, and/or any other suitable leak detection components configured to detect leaks in the ampoule's seal 108. Although in the illustrated embodiment the system 330 includes two leak detection components 434, in other embodiments the system 330 can include more or fewer leak detection components 434, such as at least one, three, four, five, six, and/or any other suitable number of leak detection components 434. In these and other embodiments, the system 330 can partially or fully prevent light from the environment external to the system 330 from entering at least a portion of the system's interior (e.g., an interior of the pressure chamber 332). In embodiments where one or more of the leak detection components 434 include an optically active or light-sensitive component, such as a photodiode, at least partially preventing light from entering an interior portion of the system 330 can improve the accuracy, sensitivity, and/or reliability of the optically-active leak detection component.

The system 330 can include one or more mounts, stands, receptacles, and/or any other suitable component sized, positioned, and/or otherwise configured to receive the ampoule 100 in the inverted configuration. In the illustrated embodiment, for example the system 330 includes the testing stand 324 (described previously regarding FIGS. 3B-3D). The testing stand 324 can be configured to support the ampoule 100 via the annular flange 105 of the base portion 104. The testing stand 324 can be configured to carry the ampoule 100 such that, when the ampoule 100 is positioned within the pressure chamber 332, at least part of the ampoule 100 can be at least partially aligned with one or more of the leak detection components 434 positioned laterally adjacent to the ampoule 100. This allows the leak detection components 434 to analyze and detect any reaction across the entire surface area of the payload below the base portion 104 as well as in the entire volume of the gap D. In the illustrated embodiment, for example, the gap 216 is laterally aligned with the one or more leak detection components 434 when the ampoule 100 is positioned within the pressure chamber 332. In other embodiments, one or more other portions of the ampoule 100 can be aligned with one or more of the leak detection components 434.

In some embodiments, the system 330 can include an actuating platform 328 (described previously regarding FIG. 3D) configured to receive the ampoule 100 in the inverted orientation and operable to position the ampoule 100 within the pressure chamber 332 at a correct position and orientation relative to the leak detection components 434. The actuating platform 328 can include one or more actuators (e.g., hydraulic actuators, pneumatic actuators, mechanical actuators, etc.) configured to move the actuating platform 328 relative to the pressure chamber 332. As described previously regarding FIGS. 3B-3D, the actuating platform 328 can include the testing stand 324 and can be positioned below the pressure chamber 332 and actuatable to move upwardly and raise the ampoule 100 toward and/or at least partially into the pressure chamber 332. In this raised position, the actuating platform 328 can form at least part of one or more of the sides or walls of the pressure chamber 332 and/or form an air-tight seal 439 (e.g., a substantially fluid-impermeable seal) with at least a portion of the pressure chamber 332. In other embodiments, the actuating platform 328 can be positioned laterally relative to the pressure chamber 332 or have any other suitable position relative to the pressure chamber 332. Accordingly, in these and other embodiments, the pressure chamber 332 can be stationary, such that positioning the ampoule 100 within the pressure chamber 332 can include moving the ampoule 100 instead of moving the pressure chamber 332.

In operation, and with the ampoule 100 positioned within the pressure chamber 332 in the inverted orientation, the pressure chamber 332 can undergo one or more pressurization cycles, including while the leak detection components 434 are monitoring the payload and the volume of the gap D to detect any sign of an air leak into the ampoule 100. For example, the interior pressure P of the pressure chamber 332 can be increased (e.g., pressurized) to and/or toward a selected upper positive pressure, such as approximately 50 psi and/or the interior pressure can be decreased (e.g., depressurized) to a selected lower pressure, such as ambient pressure. If the seal 108 includes one or more leaks, increasing the air pressure around the ampoule 100 can increase the rate at which air A within the pressure chamber 332 may enter the interior 112 of the ampoule 100. Air A entering the interior 112 of the ampoule 100 can cause one or more reactions 436 with the reactive payload 114. Each of the reactions 436 can generate energy E (e.g., optical energy, light, visible-near infrared (NIR) emissions, heat, etc., or a combination of such energies) that can pass or otherwise be detectable through one or more sides/side surfaces 202a/202b of the ampoule 100 and be detected by one or more of the leak detection components 434. For example, the energy E can pass or otherwise be detectable through the first side surface 202a and/or the second side surface 202b of the body portion 102 and be incident and/or detected by one or more laterally adjacent detection components 434. In response, the one or more detection components 434 can indicate the presence (e.g., to a user of the system 330) of the one or more leaks in the seal 108, thereby indicating a potential flaw in the tested ampoule. In some embodiments, for example, the system 330 can include a leak indicator component (not shown) that can be operably coupled to one or more of the leak detection components 434. The leak indicator component can include, for example, one or more lights, displays, readouts, and/or any other suitable indicator component. The leak indicator component can be configured to illuminate or otherwise indicate (e.g., to a user) the presence of one or more leaks detected by one or more of the leak detection components 434.

In some embodiments, at least one of the pressurization cycles can include: (i) increasing the air pressure in the pressure chamber 332 to a first selected elevated pressure, such approximately 10 psi, (ii) decreasing the air pressure to a second selected pressure, such as to ambient air pressure or approximately 5 psi, and (iii) increasing the air pressure again to a third selected elevated pressure, such as approximately 60 psi, in sequence. The pressurization cycle including pressurization, depressurization, and re-pressurization in sequence, as described above, can have a disturbance or aerosolizing effect on at least a portion of the reactive payload material 114, such as a powdered payload material adjacent to the gap D. The pressurization cycle can cause a portion of the reactive material 114 to be drawn upwardly (e.g., in the direction indicated by arrows 438) into the gap 216 to form a marking material cloud 438a at least partially between the upper surface 214a of the payload 114 and the base portion 104. This increases the volume and surface area of the reactive payload 114 that can react with any air that may enter the ampoule 100 through a leak in the seal between the body portion 102 and the base portion 104, which will generate the detectable energy E.

Leak detection systems configured in accordance with embodiments of the present technology provide several advantages compared to many other leak detection systems. For example, many leak detection systems test ampoules in a non-inverted orientation such that the ampoules under test do not include a gap between the marking material and the base portion. In these systems, the detection components can detect reactions between environmental air that enters the ampoule and interacts with the mass of marking material. However, because ampoules in the non-inverted orientation lack a gap proximate the ampoule's seal, these systems cannot detect reactions between environmental air that enters the ampoule and a cloud of (aerosolized) marking material. In contrast with many systems, leak detection systems configured in accordance with embodiments of the present technology are configured to test ampoules in an inverted orientation such that the ampoules under test include a gap between the marking material and the base portion. Accordingly, the leak detection systems described herein can detect reactions between environmental air that may enter the ampoule and a cloud of marking material induced/created within the ampoule, as described previously. The marking material cloud can partially or fully fill the gap between the marking material and the base portion, such that the marking material cloud can increase the surface area and volume of the payload that may react with air entering an ampoule through a leak and can position the marking material proximate the seal, reducing the distance the environmental air travels within the gap before reacting with the marking material cloud and/or reducing the time before a reaction. Accordingly, leak detection systems configured in accordance with embodiments of the present technology provide improved detection sensitivity, improved accuracy, and/or reduced time for completion of the testing as compared to other conventional leak detection systems.

Figure 4B:
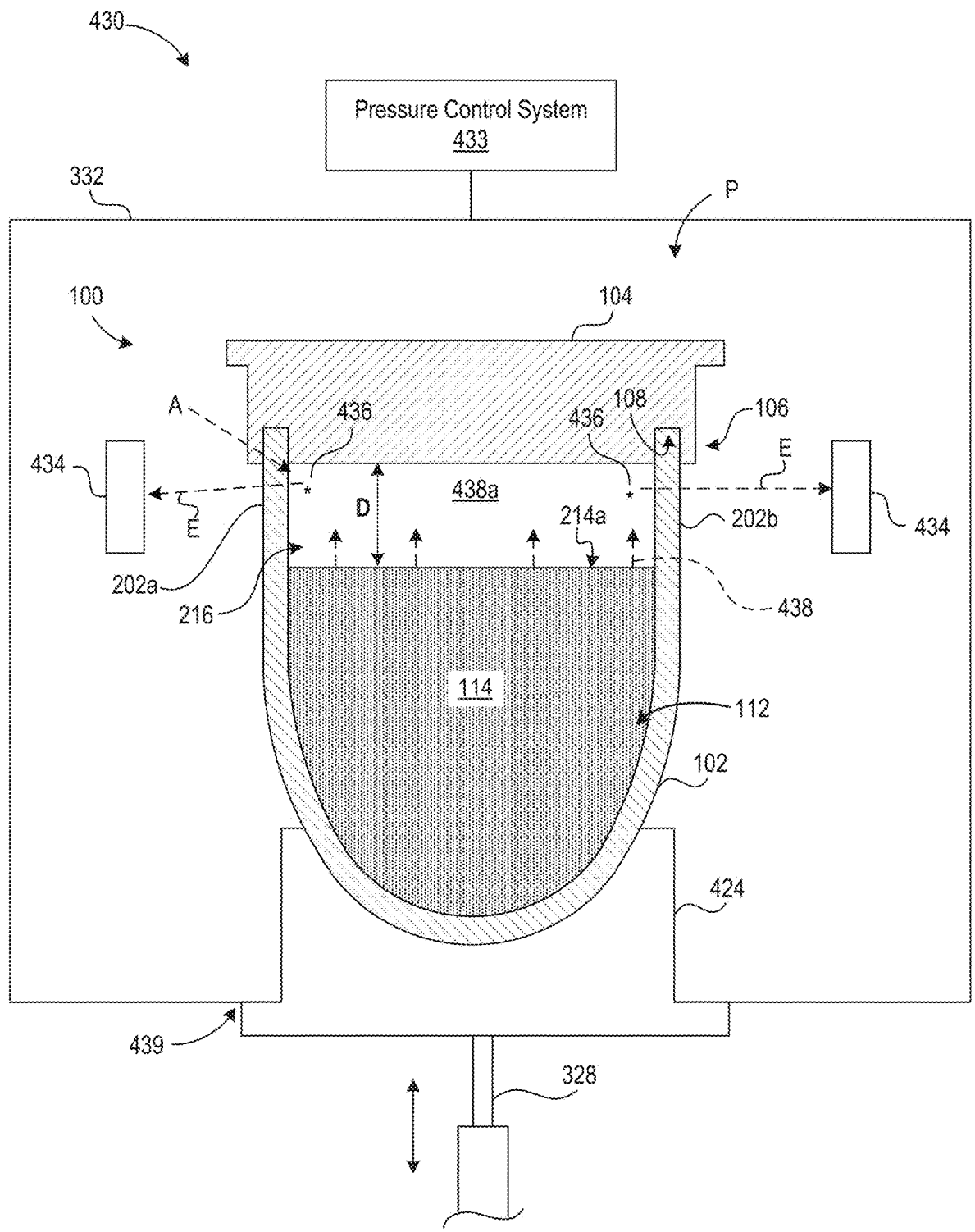
FIG. 4B is a schematic illustration of the ampoule of FIG. 2 in another leak detection system in accordance with aspects of the present technology.

FIG. 4B is schematic illustration of the ampoule 100 of FIG. 2 in another leak detection system 430 configured in accordance with various embodiments of the present technology. The leak detection system 430 can be generally similar to the leak detection system 330 of FIG. 4A, with like numbers indicating like elements. However, the leak detection system 430 includes a testing stand 424 configured to support the body portion 102 of the ampoule 100. The testing stand 424 can allow the ampoule 100 to be selectively tilted or otherwise repositioned before, during, and/or after the leak testing process.

Figure 5:
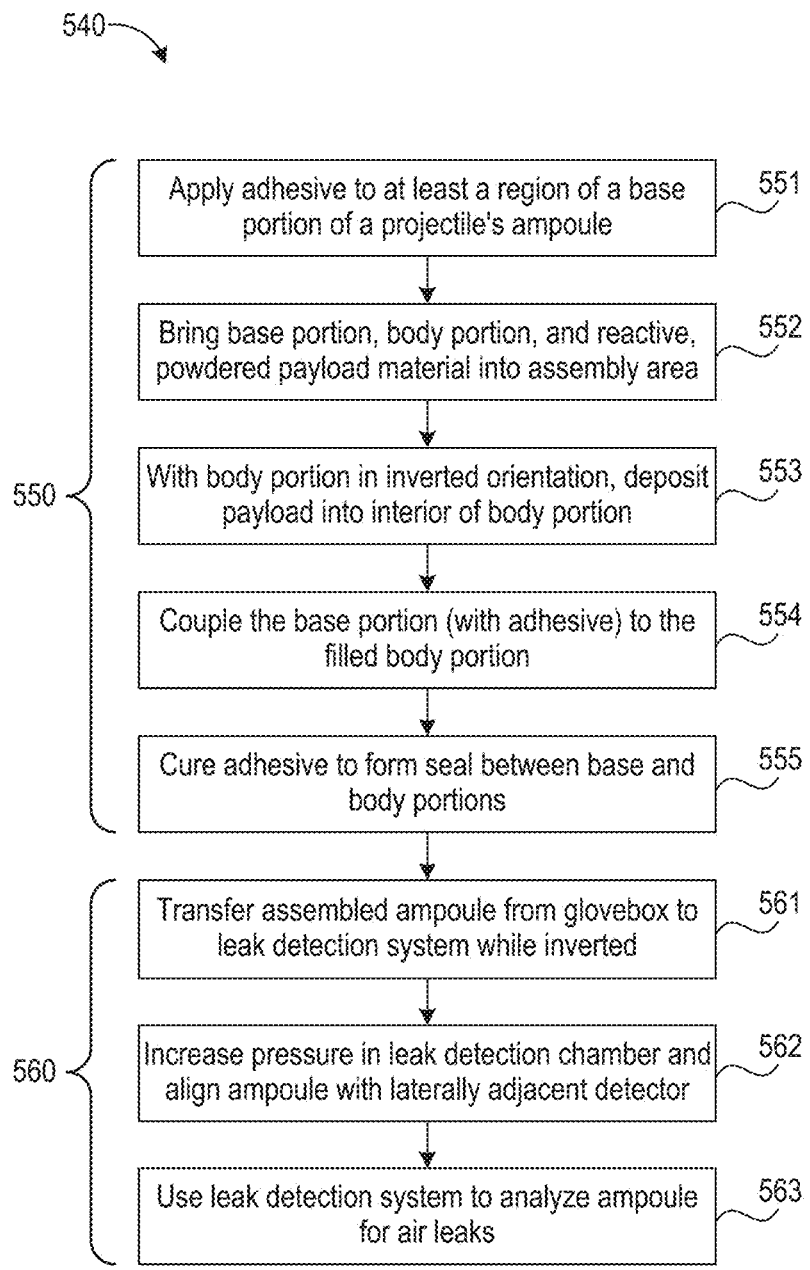
FIG. 5 is a flow diagram illustrating a method of manufacturing and testing the ampoule of FIG. 2.

FIG. 5 is a flow diagram illustrating a method 540 of manufacturing an ampoule in accordance with various embodiments of the present technology. The method 540 can include an assembly phase 550 and/or a leak testing or detection phase 560. The method 540 is illustrated as a set of blocks, steps, operations, or processes 551-555 and 561-563. All or a subset of the blocks 551-555 and 561-563 can be performed at least in part by various components of a system, such as the leak detection system 330 of FIGS. 3B, 3D, and 4A and/or the leak detection system 430 of FIG. 4B. For example, all or a subset of the blocks 551-555 and 561-563 can be performed at least in part by a leak detection component and/or other portions of a leak detection system. Additionally, or alternatively, all or a subset of the blocks 551-555 and 561-563 can be performed at least in part by an operator (e.g., a user) of the system. Moreover, any one or more of the blocks 551-555 and 561-563 can be performed with one or more components of the ampoule in an inverted orientation. Furthermore, any one or more of the blocks 551-555 and 561-563 can be performed in accordance with the discussion above. Many of the blocks 551-555 and 561-563 of the method 540 are discussed in detail below with reference to FIGS. 1-4B for the sake of clarity and understanding. It will be appreciated, however, that the method 540 may be used with other suitable leak detection systems in addition to those described herein.

The method 540 begins at block 551 by applying an adhesive to at least a region of a base portion of an ampoule. The base portion can be similar to the base portion discussed above with respect to FIGS. 1A-4B. For example, applying the adhesive to at least the region of the base portion can include applying adhesive to at least a region of the base portion 104 of FIGS. 1-4B. Continuing with this example, the region of the base portion can include an outer perimeter or peripheral region of the base portion. In at least some embodiments, the region of the base portion can be a seal-forming region of the base portion and/or a region of the base portion configured to correspond to a region of a body portion of the ampoule. The body portion can be similar to the body portion discussed above with respect to FIGS. 1A-4B. For example, the body portion can include the body portion 102 of FIGS. 1-4B. In these and other embodiments, applying the adhesive to at least the region of the base portion can include applying the adhesive to at least the region of the base portion before bringing the base portion into an assembly area (e.g., block 552), such as the inert assembly area described previously regarding FIG. 3A. Applying the adhesive before bringing the base portion into the assembly area can improve the uniformity and/or accuracy with which the adhesive is applied which, in turn, can reduce the likelihood of one or more leaks forming in the ampoule's seal.

At block 552, the method 540 continues by bringing the base portion (with the adhesive already applied), the body portion, and a selected pyrophoric or otherwise reactive payload (e.g., a pyrophoric, iron-based powdered material) into an assembly area. The assembly area can include, for example, an air-free inert environment such as a hermetically sealed glovebox, or any other suitable assembly area, such as the assembly area described previously regarding FIG. 3A. The assembly area can isolate the pyrophoric payload from the environment (e.g., environmental air) external to the assembly area, e.g., to at least partially prevent the payload from prematurely reacting. The payload can be similar to the pyrophoric material discussed above with respect to FIGS. 1-4B.

At block 553, the method 540 continues by depositing the payload material within the body portion while the body portion is in an inverted orientation with the opening 103 (FIG. 2) facing upwardly. At block 554, the method 540 continues by coupling the base portion with the adhesive already applied to the body portion filled with the pyrophoric payload. In some embodiments, the base portion has a receiving groove that receives the edge of the body portion, and the adhesive is positioned within the receiving groove so as to sealably engage with the entire perimeter of the body portion's edge that defines the opening 103 (FIG. 2). Because the body portion containing the reactive payload is inverted, the payload remains spaced apart from the adhesive and the interface between the body and base portions while the seal is being formed. Accordingly, the payload material will not interfere with the adhesive or the seal formation.

At block 555, the method 540 continues by curing the adhesive to form a complete air-tight seal between the base portion and the body portion in the receiving area and around the entire perimeter of the body portion's edge. In some embodiments, for example, curing the adhesive can include applying ultraviolet light, heat, pressure, or other curing feature as appropriate for the adhesive. Once the seal 108 is cured, the reactive payload is fully isolated in the assembled ampoule in an inert environment within the interior area, so the assembled ampoule can be removed from the glovebox or other assembly area within an inert environment. As discussed above, multiple ampoules can be fully assembled in the glovebox and transferred while in the inverted position to a transfer rack, such as with a magnetic tool, so the assembled ampoules remain inverted when moved to the testing area remote from the glovebox.

At block 561, the method 540 continues by positioning the fully assembled ampoule (e.g., block 555) in a leak detection system as discussed above while the ampoule is in the inverted orientation. In some embodiments, positioning the ampoule in the leak detection system can include positioning the ampoule within a pressure chamber of the leak detection system. The pressure chamber can be similar to the pressure chamber 332 described previously regarding FIGS. 3B-4B. In these and other embodiments, the ampoule can be manufactured at least partially in the inverted orientation such that positioning the ampoule in the leak detection system can include positioning the ampoule within the leak detection system, and/or positioning a portion of the ampoule within the annular shaped retention ring 325 (FIGS. 3C and 3D) to support the ampoule while in the inverted position. Positioning the ampoule in the leak detection system can include magnetically coupling a magnetic tool to the ampoule and moving the ampoule using the magnetic tool. The magnetic tool can be similar to the magnetic tool 326 described previously regarding FIG. 3C. In these and other embodiments, positioning the ampoule in the leak detection system can include placing the ampoule in the retention ring or other support structure on an actuating platform of the leak detection system and actuating the actuating platform to move the ampoule (e.g., upwardly) into the pressure chamber of the leak detection system. The actuating platform can be similar to the actuating platform described previously regarding FIGS. 3B-4B. For example, the actuating platform can be the actuating platform 328 of FIGS. 3B-4A and/or the actuating platform 428 of FIG. 4B. In some embodiments, positioning the ampoule in the leak detection system can include placing the ampoule on the actuating platform 328 and actuating the actuating platform 328 to move the ampoule into the pressure chamber while the leak detection system remains stationary, as described previously regarding FIGS. 3D-4B. In other embodiments, the ampoule and the retention ring or other support structure can remain stationary, and the pressure chamber component may move to receive the ampoule. In yet other embodiments, each of the supported ampoules and the pressure chamber components can be moved into engagement with each other so the assembled ampoule can be tested.

At block 562, the method 540 continues by aligning at least a portion of the ampoule with one or more leak detection components of the leak detection system. Each of the one or more leak detection components can be similar to one of the one or more leak detection components described previously regarding FIGS. 2, 4A, and 4B. For example, aligning at least the portion of the ampoule with one or more of the leak detection components can include aligning at least the portion of the ampoule with one or more of the laterally positioned leak detection components 434 of FIGS. 4A and 4B. Additionally, or alternatively, aligning at least a portion of the ampoule with one or more of the leak detection components can include aligning one or more sides and/or a gap of the ampoule with one or more of the laterally positioned leak detection components.

At block 563, the method 540 continues by using the leak detection system to analyze the ampoule for air leaks that allow air to prematurely enter the interior of the ampoule and react with the payload. In some embodiments, using the leak detection system to analyze the ampoule for leaks can include performing one or more pressurization cycles within a pressure chamber (e.g., block 561) of the leak detection system. The one or more pressurization cycles can be similar to the one or more pressurization cycles described previously regarding FIG. 4A. For example, at least one of the pressurization cycles can include in sequence (i) increasing the air pressure around the ampoule to a first level, (ii) relieving some or all of the pressure to decrease the air pressure around the ampoule, and (iii) repressurizing the air around the ampoule to a third level, which may be the same or different than the first pressure level. As the ampoule is undergoing one or more pressure cycles in the pressure chamber, the detection components 434 are monitoring the entire surface area of the payload below the gap, as well as monitoring the entire volume of the gap above the payload to detect any other leak-related indicia, such as a reaction between the payload material and any air that may have entered the ampoule through a leak.

Although the steps of the method 540 are discussed and illustrated in a particular order, the method 540 illustrated in FIG. 5 is not so limited. In other embodiments, the method 540 can be performed in a different order. In these and other embodiments, any of the steps of the method 540 (e.g., block 552) can be performed before, during, and/or after any of the other steps of the method 540 (e.g., block 551). Moreover, a person of ordinary skill in the relevant art will recognize that the illustrated method 540 can be altered and still remain within these and other embodiments of the present technology. For example, one or more steps of the method 540 (e.g., block 562) illustrated in FIG. 4 can be omitted and/or repeated in some embodiments.

Conclusion

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the word "or" refers to any possible permutation of a set of items. For example, the phrase "A, B, or C" refers to at least one of A, B, and C, or any combination therefore, such as any of A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

We claim:

1. A method for assembling and testing an ampoule assembly for air leakage, the ampoule assembly having a body portion, a base portion, and a pyrophoric payload, the method comprising:
    positioning the body portion, the base portion, and the pyrophoric payload in an air-free, inert environment, wherein the body portion has a closed end, an open end, and an interior area;
    positioning the pyrophoric payload into the interior area of the body portion through the open end, wherein the body portion is oriented with the open end above the closed end;

attaching the base portion to the open end of the body portion with the pyrophoric payload enclosed in the interior area and with a seal formed between the base portion and the body portion, wherein the ampoule assembly is oriented in an inverted orientation with the base portion vertically above the pyrophoric payload in the interior area and with an upper surface of the pyrophoric payload being spaced apart from the base portion by a gap;

removing the ampoule assembly from the air-free, inert environment;

positioning the ampoule assembly in a testing environment that contains air, wherein the ampoule assembly is in the inverted orientation with the gap laterally adjacent to a detection component configured to detect through the body portion energy from the upper surface pyrophoric payload; and monitoring with the laterally adjacent detection component the upper surface of the pyrophoric payload or the gap to detect light or heat energy from a reaction between air and the pyrophoric payload, wherein the reaction indicates an air leak in the seal between the base portion and the body portion.

2. The method of claim 1 wherein forming a seal comprises coupling the body portion and base portion with an adhesive to form an annular seal in a plane substantially perpendicular to a longitudinal axis of the ampoule assembly.

3. The method of claim 1, further comprising moving the ampoule assembly from the air-free, inert environment to the testing environment while the ampoule assembly remains in the inverted orientation with the pyrophoric payload being carried in the body portion below the gap.

4. The method of claim 1 wherein positioning the ampoule assembly in a testing environment in the inverted orientation maintains an optical path laterally through the ampoule assembly, and the monitoring by the detection component is conducted laterally along the optical path.

5. The method of claim 1, further comprising detecting with the detection component the energy generated in the form of light or heat or both through at least part of the body portion.

6. The method of claim 1, further comprising positioning the ampoule assembly in a transfer rack in the air-free, inert environment with the transfer rack supporting the ampoule assembly in the inverted position, and the transfer rack and the ampoule assembly are moved as a unit to the testing environment.

7. The method of claim 6 wherein the base portion includes a magnetic material, and the ampoule assembly is positioned in the transfer rack with a tool that magnetically engages with the magnetic material in the base portion.

8. The method of claim 1 wherein positioning the ampoule assembly in the testing environment includes positioning the ampoule assembly in a pressure chamber, pressurizing air in the pressure chamber to a selected pressure above ambient pressure, and monitoring the upper surface of the pyrophoric payload or the gap while the ampoule assembly is under pressure.

9. The method of claim 1 wherein positioning the ampoule assembly in the testing environment includes positioning the ampoule assembly in a testing stand that supports the ampoule assembly in the inverted position, and positioning the testing stand and the inverted ampoule assembly as a unit in a pressure chamber with the gap of the ampoule assembly laterally aligned with the detecting component.

10. The method of claim 9, further comprising pressurizing air in the pressure chamber with the ampoule assembly therein to a selected pressure above ambient pressure and monitoring the upper surface of the pyrophoric payload or the gap while the ampoule assembly is under pressure.

11. The method of claim 10 wherein the testing stand comprises a closure plate configured to sealably engage the pressure chamber, wherein the method further comprises forming a chamber door with the closure plate to sealably close the pressure chamber.

12. The method of claim 1 where the monitoring comprises using a plurality of detection components positioned in lateral alignment with the gap of the ampoule assembly for detection of the light or heat energy in the gap or along the upper surface of the pyrophoric payload from a reaction between air and the pyrophoric payload.

13. A method for testing an ampoule assembly for air leakage, the ampoule assembly having a body portion, a base portion, and a pyrophoric payload, the method comprising:

transferring the ampoule assembly from an air-free, inert environment to a testing environment containing air, wherein the base portion is sealably attached to the open end of the body portion with the pyrophoric payload contained in the body portion, wherein the ampoule assembly is oriented in an inverted orientation with the base portion vertically above the pyrophoric payload in the interior area with an upper surface of the pyrophoric payload being spaced apart from the base portion by a gap;

positioning the ampoule assembly in the testing environment with the gap in lateral alignment with a detection component, wherein the detection component is configured to detect energy emission from the pyrophoric payload; and monitoring with the detection component the upper surface of the pyrophoric payload or the gap to detect light or heat energy from a reaction between air and the pyrophoric payload while the ampoule assembly remains in the inverted position, wherein the reaction indicates an air leak in the seal between the base portion and the body portion.

14. The method of claim 13, further comprising forming an annular seal between the body portion and base portion in a plane substantially perpendicular to a longitudinal axis of the ampoule assembly.

15. The method of claim 13, further comprising moving the ampoule assembly from the air-free, inert environment to the testing environment while the ampoule assembly remains in the inverted orientation.

16. The method of claim 13 wherein positioning the ampoule assembly in the testing environment in the inverted orientation maintains an optical path laterally through the ampoule assembly, and the monitoring by the detection component is conducted laterally along the optical path.

17. The method of claim 13, further comprising positioning the ampoule assembly in a transfer rack in the air-free, inert environment with the transfer rack supporting the ampoule assembly in the inverted position, and the transfer rack and the ampoule assembly are moved as a unit to the testing environment.

18. The method of claim 13 wherein positioning the ampoule assembly in a testing environment includes positioning the ampoule assembly in a pressure chamber, pressurizing air in the pressure chamber to a pressure above ambient pressure, and monitoring the upper surface of the pyrophoric payload or the gap while the ampoule assembly is under pressure.

19. The method of claim 13 wherein positioning the ampoule assembly in a testing environment includes positioning the ampoule assembly in a testing stand that supports the ampoule assembly in the inverted position, and positioning the testing stand and the inverted ampoule assembly as a unit in a pressure chamber with the gap of the ampoule assembly laterally aligned with the detecting component.

20. The method of claim 19 wherein the testing stand comprises a closure plate configured to sealably engage the pressure chamber, wherein the method further comprises forming a chamber door with the closure plate to sealably close the pressure chamber.

21. The method of claim 13 wherein positioning the ampoule assembly in a testing environment includes positioning the ampoule assembly in a pressure chamber, the method comprises applying a plurality of pressurization cycles to the ampoule assembly that includes increasing and decreasing air pressure in the pressure chamber and monitoring the upper surface of the pyrophoric payload or the gap during the plurality of pressurization cycles.

* * * * *